United States Patent
Kabalnov et al.

(10) Patent No.: US 11,305,486 B2
(45) Date of Patent: Apr. 19, 2022

(54) DISPERSION AND JETTABLE COMPOSITION CONTAINING METAL OXIDE NANOPARTICLES

(71) Applicant: HEWLETT-PACKARD DEVELOPMENT COMPANY, L.P., Houston, TX (US)

(72) Inventors: Alexey S. Kabalnov, San Diego, CA (US); Stephen G. Rudisill, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 756 days.

(21) Appl. No.: 16/074,284

(22) PCT Filed: Aug. 30, 2017

(86) PCT No.: PCT/US2017/049382
§ 371 (c)(1),
(2) Date: Jul. 31, 2018

(87) PCT Pub. No.: WO2018/080630
PCT Pub. Date: May 3, 2018

(65) Prior Publication Data
US 2021/0189162 A1 Jun. 24, 2021

Related U.S. Application Data

(63) Continuation-in-part of application No. PCT/US2016/058684, filed on Oct. 25, 2016, and a
(Continued)

(51) Int. Cl.
*C09D 11/00* (2014.01)
*B29C 64/165* (2017.01)
(Continued)

(52) U.S. Cl.
CPC ........ *B29C 64/165* (2017.08); *B29C 37/0025* (2013.01); *B29C 64/264* (2017.08);
(Continued)

(58) Field of Classification Search
USPC .............. 106/31.01, 31.13, 31.6, 31.75
See application file for complete search history.

(56) References Cited

U.S. PATENT DOCUMENTS 5,204,055 A 4/1993 Sachs et al.
5,973,026 A * 10/1999 Burns ............... C09D 11/38
106/31.6

(Continued)

FOREIGN PATENT DOCUMENTS

CA 2927249 A1 4/2015
CN 1867917 11/2006
(Continued)

OTHER PUBLICATIONS

Dong-Chu et al., "Preparation of Nano-WO_3 by Thermal Decomposition and Study of Its Grain Characteristics and Dispersion Behavior", Fine Chemicals, Retrieved from internet—http://en.cnki.com.cn/Article_en/CJFDTOTAL-JXHG200711004.htm, 2007, 3 Pages.
(Continued)

*Primary Examiner* — James E McDonough
(74) *Attorney, Agent, or Firm* — HPI Patent Department

(57) ABSTRACT

Disclosed herein is a water-based dispersion, which includes metal oxide nanoparticles and a zwitterionic stabilizer. More specifically, the dispersion comprises a metal oxide nanoparticle having the formula (1) $M_mM'O_n$, wherein M is an alkali metal, m is greater than 0 and less than 1, M' is any metal, and n is greater than 0 and less than or equal to 4; a zwitterionic stabilizer; and a balance of water. Also disclosed herein is a jettable composition, which includes metal oxide nanoparticles having the formula (1) $M_mM'O_n$
(Continued)

wherein M is an alkali metal, m is greater than 0 and less than 1, M' is any metal, and n is greater than 0 and less than or equal to 4; a zwitterionic stabilizer; a surfactant; and a balance of water.

20 Claims, 3 Drawing Sheets

Related U.S. Application Data continuation-in-part of application No. PCT/US2016/058686, filed on Oct. 25, 2016.

(51) Int. Cl.

| | | |
|---|---|---|
| *B33Y 70/00* | (2020.01) | |
| *B33Y 10/00* | (2015.01) | |
| *C09D 11/322* | (2014.01) | |
| *C09D 11/328* | (2014.01) | |
| *B82Y 30/00* | (2011.01) | |
| *B29C 37/00* | (2006.01) | |
| *B29C 64/264* | (2017.01) | |
| *B33Y 70/10* | (2020.01) | |
| *C09D 11/033* | (2014.01) | |
| *C09D 11/037* | (2014.01) | |
| *C09D 11/38* | (2014.01) | |
| *B33Y 80/00* | (2015.01) | |
| *C09D 11/324* | (2014.01) | |
| *C09D 1/00* | (2006.01) | |
| *C09D 4/00* | (2006.01) | |
| *C09D 5/00* | (2006.01) | |
| *C09D 13/00* | (2006.01) | |
| *C09K 3/00* | (2006.01) | |
| *B29K 105/00* | (2006.01) | |
| *B29K 509/00* | (2006.01) | |
| *B22F 10/14* | (2021.01) | |
| *B29K 33/04* | (2006.01) | |

(52) U.S. Cl.
CPC ............... *B33Y 10/00* (2014.12); *B33Y 70/00* (2014.12); *B33Y 70/10* (2020.01); *B33Y 80/00* (2014.12); *B82Y 30/00* (2013.01); *C09D 11/033* (2013.01); *C09D 11/037* (2013.01); *C09D 11/322* (2013.01); *C09D 11/324* (2013.01); *C09D 11/328* (2013.01); *C09D 11/38* (2013.01); *B22F 10/14* (2021.01); *B29K 2033/04* (2013.01); *B29K 2105/251* (2013.01); *B29K 2509/00* (2013.01); *B29K 2995/002* (2013.01)

(56) References Cited

U.S. PATENT DOCUMENTS

| | | | |
|---|---|---|---|
| 6,259,962 B1 | 7/2001 | Gothait | |
| 7,007,872 B2 | 3/2006 | Yadav et al. | |
| 7,708,974 B2 | 5/2010 | Yadav | |
| 7,972,426 B2 | 7/2011 | Hinch et al. | |
| 8,430,475 B2* | 4/2013 | Kabalnov | C09D 11/322 |
| | | | 347/20 |
| 8,651,190 B2 | 2/2014 | Dietz | |
| 8,651,390 B2 | 2/2014 | Hinch et al. | |
| 9,234,110 B2 | 1/2016 | Katoh et al. | |
| 9,643,359 B2 | 5/2017 | Baumann et al. | |
| 10,682,810 B2* | 6/2020 | Rudisill | C09D 11/328 |
| 10,759,112 B2* | 9/2020 | Rudisill | C09D 11/324 |
| 2005/0074589 A1 | 4/2005 | Pan et al. | |
| 2005/0126434 A1* | 6/2005 | Feldkamp | C09D 11/38 |
| | | | 106/31.43 |
| 2005/0271566 A1 | 12/2005 | Yadav | |
| 2006/0083694 A1 | 4/2006 | Kodas et al. | |
| 2006/0251996 A1* | 11/2006 | Bogerd | B32B 27/08 |
| | | | 430/323 |
| 2007/0238056 A1 | 10/2007 | Baumann et al. | |
| 2007/0241482 A1 | 10/2007 | Giller et al. | |
| 2008/0087188 A1* | 4/2008 | Kabalnov | C09D 11/40 |
| | | | 106/31.6 |
| 2008/0187677 A1* | 8/2008 | Kabalnov | C09D 11/30 |
| | | | 427/466 |
| 2008/0259147 A1* | 10/2008 | Oriakhi | C09D 11/30 |
| | | | 347/100 |
| 2009/0031922 A1 | 2/2009 | Rengaswamy et al. | |
| 2009/0214766 A1* | 8/2009 | Magdassi | B82Y 30/00 |
| | | | 427/125 |
| 2010/0102700 A1 | 4/2010 | Jaiswal et al. | |
| 2010/0140852 A1 | 6/2010 | Kritchman et al. | |
| 2012/0145037 A1 | 6/2012 | Deluca et al. | |
| 2012/0225264 A1 | 9/2012 | Villwock | |
| 2013/0072615 A1 | 3/2013 | Muro et al. | |
| 2014/0352573 A1* | 12/2014 | Kasperchik | C09D 11/326 |
| | | | 106/15.05 |
| 2015/0298394 A1 | 10/2015 | Sheinman | |
| 2015/0307666 A1 | 10/2015 | Kodas et al. | |
| 2015/0329679 A1 | 11/2015 | Yoshida et al. | |
| 2016/0011348 A1 | 1/2016 | Hirakoso et al. | |
| 2016/0081526 A1* | 3/2016 | Gottinger | A47L 11/4008 |
| | | | 180/89.1 |
| 2016/0082697 A1 | 3/2016 | Hara et al. | |
| 2016/0168407 A1* | 6/2016 | Jarvis | B41M 5/30 |
| | | | 424/443 |
| 2016/0178804 A1 | 6/2016 | Shen et al. | |
| 2016/0263829 A1 | 9/2016 | Okamoto | |
| 2016/0332384 A1* | 11/2016 | De Pena | B33Y 30/00 |
| 2018/0272602 A1* | 9/2018 | Rudisill | B29C 64/112 |
| 2019/0054689 A1* | 2/2019 | Rudisill | C09D 11/324 |
| 2019/0240898 A1* | 8/2019 | Chaffins | C08K 3/08 |
| 2020/0376753 A1* | 12/2020 | Kabalnov | B29C 64/165 |
| 2021/0040686 A1* | 2/2021 | Lebron | D06P 5/2083 |
| 2021/0047777 A1* | 2/2021 | Lebron | C09D 11/322 |

FOREIGN PATENT DOCUMENTS

| | | |
|---|---|---|
| CN | 100488768 C | 5/2009 |
| CN | 101663366 | 3/2010 |
| CN | 101765644 | 6/2010 |
| CN | 101959949 A | 1/2011 |
| CN | 104136555 | 11/2014 |
| CN | 104347728 A | 2/2015 |
| CN | 105324689 | 2/2016 |
| CN | 105934485 A | 9/2016 |
| CN | 104487397 B | 10/2018 |
| DE | 112014006117.8 | 9/2016 |
| EP | 1724110 A1 | 11/2006 |
| EP | 2997869 A1 | 3/2016 |
| EP | 2998769 A1 | 3/2016 |
| JP | 2007-502713 A | 2/2007 |
| JP | 2011-503274 A | 1/2011 |
| JP | 2014114202 | 6/2014 |
| JP | 2014-527481 A | 10/2014 |
| JP | 2015214682 A | 12/2015 |
| KR | 10-2006-0115560 A | 11/2006 |
| KR | 2008-0007310 | 1/2008 |
| KR | 1020160011197 | 11/2016 |
| WO | 2005047007 A2 | 5/2005 |
| WO | WO2007114895 A2 | 10/2007 |
| WO | WO2011155635 A1 | 12/2011 |
| WO | 2013162513 A1 | 10/2013 |
| WO | WO2014168189 A1 | 10/2014 |
| WO | Wo-2015186663 | 12/2015 |
| WO | WO2016048348 A1 | 3/2016 |
| WO | WO2016048375 A1 | 3/2016 |
| WO | WO2016048380 A1 | 3/2016 |
| WO | 2016/068899 A1 | 5/2016 |
| WO | WO2016114362 A1 | 7/2016 |
| WO | WO2016158604 A1 | 10/2016 |
| WO | WO 2018/080438 A1 * | 5/2018 |
| WO | WO 2018/080456 A1 * | 5/2018 |
| WO | WO 2018/080457 A1 * | 5/2018 |

(56) References Cited

FOREIGN PATENT DOCUMENTS

| WO | WO2018156145 | A1 | | 8/2018 |
| WO | WO 2018/174890 | A1 | * | 9/2018 |
| WO | WO2018199955 | | | 11/2018 |

OTHER PUBLICATIONS

Faraday, Michael "X. The Bakerian Lecture.—Experimental relations of gold (and other metals) to light." Philosophical Transactions of the Royal Society of London 147 (1857): 145-161.

Garcia, Guillermo, et al. "Dynamically modulating surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences." (2014): 3240-3253.

Kanehara, Masayuki, et al., "Indium tin oxide nanoparticles with compositionally tunable surface plasmon . . . " Jrnl of the Amer Chem Society 131.49, 17736-17737, Nov. 2009.

Milligan, W. O., and R. H. Morriss. "Morphology of Colloidal Gold—A Comparative Study." Journal of the American Chemical Society 86.17 (1964): 3461-3467.

Usul, Hiroyuki, Takeshi Sasaki, and Naoto Koshizaki. "Optical transmittance of indium tin oxide nanoparticles prepared by laser-induced fragmentation in water." The Journal of Physical Chemistry B 110.26 (2006): 12890-12895.

Van der Zande, Bianca Mi. et al. "Aqueous gold sols of rod-shaped particles." The Journal of Physical Chemistry B 101.6 (1997): 852-854.

Weiser, H., et al, "Von Weimark's Precipitation Theory and the Formation of Colloidal Gold", 10 pages, The Rice Institute, Houston, TX., no date available.

Takeda etal., "Near Infrared Absorption of Tungsten Oxide Nanoparticle Dispersions", J. Am. Ceram. Soc., 90 [12] p. 4059-4061.

International Search Report and Written Opinion for International Publication No. PCT/US2016/058684 dated Aug. 24, 2017, 9 pages.

\* cited by examiner

DISPERSION AND JETTABLE COMPOSITION CONTAINING METAL OXIDE NANOPARTICLES

BACKGROUND

Three-dimensional (3D) printing can be defined as an additive printing process used to make three-dimensional objects or parts from a digital model. 3D printing is often used in rapid product prototyping, mold generation, and mold master generation. Some 3D printing techniques are considered additive processes because they involve the application of successive layers of material. Three-dimensional printing technology can use inkjet technology. Inkjet printing is a non-impact printing method that utilizes electronic signals to control and direct droplets or a stream of ink or material to be deposited on substrate. Current inkjet printing technology involves forcing the ink drops through small nozzles by thermal ejection, piezoelectric pressure or oscillation onto the surface of a substrate. The materials used in such technologies should have specific capabilities and properties.

BRIEF DESCRIPTION OF THE DRAWINGS

Features of examples of the present disclosure will become apparent by reference to the following detailed description and drawings.

DETAILED DESCRIPTION

Figure 1:
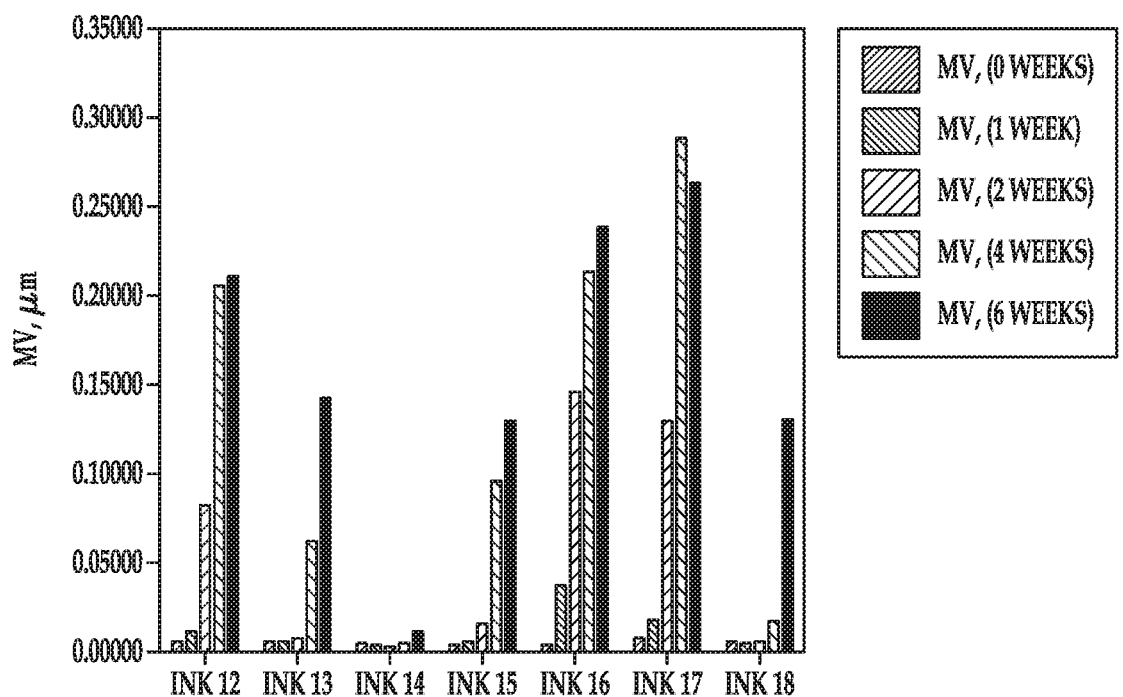
FIG. 1 is a bar graph depicting the volume-weighted mean diameter (MV, or mean diameter, in μm, of the volume distribution, Y axis) of examples of the composition disclosed herein.

Disclosed herein is a water-based dispersion, which includes metal oxide nanoparticles and a zwitterionic stabilizer. More specifically, the dispersion comprises a metal oxide nanoparticle having the formula (1) $M_mM'O_n$ wherein M is an alkali metal, m is greater than 0 and less than 1, M' is any metal, and n is greater than 0 and less than or equal to 4; a zwitterionic stabilizer; and a balance of water. Also disclosed herein is a jettable composition, which includes metal oxide nanoparticles having the formula (1) $M_mM'O_n$ wherein M is an alkali metal, m is greater than 0 and less than 1, M' is any metal, and n is greater than 0 and less than or equal to 4; a zwitterionic stabilizer; a surfactant; and a balance of water.

In some examples, the metal oxide nanoparticles and zwitterionic stabilizer may be incorporated (as a pigment dispersion and/or an absorbing agent dispersion) into a water-based vehicle to form a jettable composition. In other examples, the zwitterionic stabilizer and the metal oxide nanoparticles may be added directly to the water-based vehicle to form a jettable composition. The dispersion and the jettable composition comprising metal oxide nanoparticles described herein have good stability. Enhanced stability of the dispersion and of the jettable composition may be observed by minimal or no changes in pH, particle size (e.g., volume-weighted mean diameter), viscosity, and/or infrared (IR) absorbance over time. As such, stabilization of the metal oxide nanoparticle dispersion and/or the jettable composition can be measured in terms of pH stability, physical stability, viscosity stability, and/or IR absorbance stability.

The term "pH stability," as referred to herein, means the ability of the dispersion or jettable composition to maintain a substantially unchanged pH over time (e.g., within +0.5 of the original pH). The term "physical stability," as referred to herein, means the ability of the nanoparticles in the dispersion or jettable composition to remain substantially unchanged over time. To determine the physical stability of a composition, the change in particle size may be measured over time (e.g., using dynamic light scattering), and the percentage of size change may be determined. The particle size may be considered to be "substantially unchanged over time" when the particle size does not increase above 20 nm (from its original size). However, in some instances, larger particle size increases may still be considered physically stable, as long as the particles do not settle. One method for determining the physical stability is to measure the particle size, in terms of volume-weighted distribution, of the nanoparticles. Such a distribution represents the population of particles, seen by their volume. As an example, the volume-weighted mean diameter may be measured with a Nanotrac® particle sizing system (which may use a 50% cumulative value of a volume-weighted mean diameter), commercially available from Microtrac, Inc. The particle sizing system uses dynamic scattering of laser light.

In the examples disclosed herein, the volume-weighted mean diameter measurement is the mean diameter of the metal oxide nanoparticles within a specific volume. The volume-weighted mean diameter is sometimes called the de Brouckere mean diameter, and is the weighted average volume diameter, assuming spherical particles of the same volume as the actual particles. If after storage, the volume-weighted mean diameter remains relatively constant, this is an indication of a stable dispersion or jettable composition. However, if the volume-weighted mean diameter increases significantly after the dispersion or jettable composition has been in storage, this may be a sign of undesirable agglomeration and an indication of a less stable dispersion or jettable composition.

The term "viscosity stability," as referred to herein, means the ability of the dispersion or jettable composition to maintain a substantially unchanged viscosity over time (e.g., does not rise above 5 cP at room temperature, e.g., a temperature ranging from 18° C. to 22° C.). The term "IR absorbance stability," as referred to herein means the ability of the dispersion or jettable composition to maintain a substantially unchanged IR absorbance over time (e.g., no more than a 100% loss in absorbance).

To facilitate the measurement of the pH change, the particle size change, the viscosity change, and/or the IR absorbance change, the dispersion or jettable composition may be stored in an accelerated storage (AS) environment. The pH, particle size, viscosity, and/or IR absorbance may be measured before and after the dispersion or jettable composition has been stored in the AS environment. The accelerated storage environment may be an environment that has a temperature ranging from about 45° C. to about 60° C. In an example, the accelerated storage environment is an oven baked at a temperature of about 60° C. and the dispersion or jettable composition is stored in the AS environment for about six weeks. An additional way to facilitate the measurement of the pH change, the particle size change, the viscosity change, and/or the IR absorbance change is to subject the dispersion or jettable composition to a Temperature-cycle (T-cycle). A T-cycle test may indicate an instability in the dispersion or jettable composition that is not indicated by an AS environment test. Conversely, an AS environment test may indicate an instability in the dispersion or jettable composition that is not indicated by a T-cycle test. A stable dispersion or jettable composition should be able pass both an AS environment test and a T-cycle test. When conducting a T-cycle test, the pH, particle size, viscosity, and/or IR absorbance may be measured before and after the dispersion or jettable composition has undergone the T-cycle. The T-cycle may involve heating the dispersion or jettable composition to a high temperature and maintaining the dispersion or jettable composition at the high temperature for a few minutes, and then cooling the dispersion or jettable composition to a low temperature and maintaining the dispersion or jettable composition at the low temperature for a few minutes. The process may be repeated for a number of cycles (e.g., 5).

As mentioned above, a large pH change, a large particle size change, a large viscosity change, and/or a large IR absorbance change may indicate poor dispersion or jettable composition stabilization. Moreover, a large pH change (e.g., a pH change of greater than 0.5), a large particle size change (e.g., a particle size increase to above 20 nm), or a large viscosity change (e.g., a viscosity increase to above 5 cP) can lead to a short shelf life of the dispersion or jettable composition. As one example, a large particle size change may result from phase separation in the bulk jettable composition (e.g., nanoparticles separating from the vehicle, agglomerating with one another, and/or settling), which would cause the jettable composition to be unusable. A large pH change, a large particle size, or a large viscosity change may also alter the jettability and/or the image quality. As previously mentioned, nanoparticle agglomeration and/or settling may render the jettable composition more difficult to jet. As another example, a large pH change can cause a large change in dispersion or jettable composition viscosity. If the pH decreases too much, the viscosity of the dispersion or jettable composition may increase, which renders the dispersion or jettable composition susceptible to faster hardening, which can clog printhead nozzles. If the pH increases too much, the viscosity of the dispersion or jettable composition may decrease, which causes the dispersion or jettable composition to be weak, to dry slowly, to exhibit poor water resistance, etc. Still further, a large IR absorbance change (e.g., an IR absorbance change of greater than 10% loss in absorbance) may render the dispersion or jettable composition unusable as an IR absorbing agent.

The jettable composition disclosed herein can be used, and applied, using any known inkjet printing technique, such as, for example, continuous inkjet printing or drop-on-demand inkjet printing including, piezoelectric and thermal inkjet printing. The jettable composition may, in some instances, be used as an inkjet ink. For example, the metal oxide nanoparticles may give the jettable composition a blue color (the strength of which may vary depending on the amount of the nanoparticles present), and thus may be used as an inkjet ink. For another example, the jettable composition may include an additional colorant (in addition to the metal oxide nanoparticles), and thus may be used as an inkjet ink.

In some examples, the jettable composition including the metal oxide nanoparticle described above, a zwitterionic stabilizer, a surfactant and a balance of water is formulated to be used three-dimensional (3D) printing system. In some other examples, the jettable composition including the metal oxide nanoparticle describe above is formulated to be used as a fusing agent in a three-dimensional printing system.

As used herein, "jet" "jettable," "jetting," or the like refers to compositions that are ejected from jetting architecture, such as inkjet architecture. Inkjet architecture can include thermal or piezo drop on demand architecture, as well as continuous inkjet architecture. Additionally, such architecture can be configured to print varying drop sizes, for example, less than 50 picolitres (pl), less than 40 pl, less than 30 pl, less than 20 pl, less than 10 pl. In some examples, the drop size may be 1 to 40 pl, for example, 3 or 5 to 30 pl.

The term "fusing agent" is used herein to describe agents that may be applied to particulate build material, and which may assist in fusing the build material to form a layer of a 3D part. Heat may be used to fuse the build material, but the fusing agent can also assist in binding powder together, and/or in generating heat from electromagnetic energy. For example, a fusing composition may include a fusing agent that can bind the build material together in preparation for heating to fuse the materials together, or may be an additive that becomes energized or heated when exposed to a frequency or frequencies of electromagnetic radiation. Any additive that assists in fusing particulate build material to form the 3D printed part can be used.

Dispersion

The present disclosure refers to a dispersion comprising a metal oxide nanoparticle having the formula (1) $M_mM'O_n$ wherein M is an alkali metal, m is greater than 0 and less than 1, M' is any metal, and n is greater than 0 and less than or equal to 4; a zwitterionic stabilizer; and a balance of water.

As used herein, the term "dispersion" refers to a two-phases system where one phase consists of finely divided metal oxide particle distributed throughout a bulk substance, i.e. liquid vehicle. The metal oxide nanoparticle is the dispersed or internal phase and the bulk substance is the continuous or external phase (liquid vehicle). As disclosed herein the liquid medium is an aqueous liquid medium, i.e. comprising water.

In some example, the metal oxide nanoparticles may be present in the dispersion in an amount ranging from about 1 wt % to about 20 wt % based on the total wt % of the dispersion. In some other example, the zwitterionic stabilizer may be present in the dispersion in an amount ranging from about 2 wt % to about 35 wt % (based on the total wt % of the dispersion). In yet some other examples, the weight ratio of the metal oxide nanoparticles to the zwitterionic stabilizer ranges from 1:10 to 10:1. In another example, the weight ratio of the metal oxide nanoparticles to the zwitterionic stabilizer is 1:1.

Nanoparticles

In some examples, described herein is a nanoparticle metal oxide having formula (1): $M_mM'O_n$ wherein M is an alkali metal, m is greater than 0 and less than 1, M' is any metal, and n is greater than 0 and less than or equal to 4.

As per formula (1), M is an alkali metal, and can be lithium (Li), sodium (Na), potassium (K), rubidium (Rb), cesium (Cs), or mixtures thereof. Indeed, without being linked by any theory, it is believed that such compound possesses a satisfactory absorption of NIR light (having a wavelength between about 750 nm to about 1400 nm) while retaining a high transmittance of visible light (having a wavelength between about 380 nm to about 750 nm).

In some examples, the nanoparticles of the present disclosure absorb infrared light in a range of from about 750 nm to about 2300 nm. In some other examples, the nanoparticles of the present disclosure absorb infrared light in a range of from about 780 nm to about 1400 nm. In yet some other examples, the nanoparticles of the present disclosure absorb infrared light in a range of from about 780 nm to about 2300 nm. The metal oxide nanoparticles can also absorb infrared light in a range of from about 780 nm to about 2300 nm, or from about 790 nm to about 1800 nm, or from about 800 nm to about 1500 nm, or from about 810 nm to about 1200 nm, or from about 820 nm to about 1100 nm, or from about 830 nm to about 1000 nm. The metal oxide can be an IR absorbing inorganic nanoparticle.

The metal oxide nanoparticles of the present disclosure have the formula (1) $M_mM'O_n$. In the formula (1), M is an alkali metal. In some examples, M is lithium (Li), sodium (Na), potassium (K), rubidium (Rb), cesium (Cs), or mixtures thereof. In some other examples, M is cesium (Cs). In the formula (1), M' is any metal. In some examples, M' is tungsten (W), molybdenum (Mb), tantalum (Ta), hafnium (Hf), cerium (Ce), lanthanum (La), or mixtures thereof. In some other examples, M' is tungsten (W). In the formula (1), m is greater than 0 and less than 1. In some examples, m can be 0.33. In the formula (1), n is greater than 0 and less than or equal to 4. In some examples, n can be greater than 0 and less than or equal to 3. In some examples, the nanoparticles of the present disclosure have the formula (1) $M_mM'O_n$, wherein M is tungsten (W), n is 3 and M is lithium (Li), sodium (Na), potassium (K), rubidium (Rb), cesium (Cs), or mixtures thereof. The nanoparticles are thus Tungsten bronzes nanoparticles having the formula $MmWO_3$.

In some other examples, the metal oxide nanoparticle is a Cesium Tungsten nanoparticles having the formula (1) $M_mM'O_n$, wherein M is cesium (Cs), m is 0.33, M' is tungsten (W), and n is greater than 0 and less than or equal to 3. In an example, the metal oxide nanoparticle is a cesium tungsten oxide nanoparticles having a general formula of $CsxWO_3$, where $0<x<1$. The cesium tungsten oxide nanoparticles may give the dispersion a light blue color. The strength of the color may depend, at least in part, on the amount of the cesium tungsten oxide nanoparticles in the dispersion.

In some examples, the metal oxide particles can have a diameter of from about 0.01 nm to about 400 nm, or from about 0.1 nm to about 350 nm, or from about 0.5 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 3 nm to about 30 nm, or from about 3 to about 20 nm, or from about 3 to about 10 nm. In a more specific example, the average particle size (e.g., volume-weighted mean diameter) of the metal oxide nanoparticles may range from about 1 nm to about 40 nm. In some examples, the average particle size of the metal oxide nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

Zwitterionic Stabilizer

The dispersion of the present disclosure, comprising metal oxide nanoparticles, also includes the zwitterionic stabilizer. The zwitterionic stabilizer may improve the stabilization of the dispersion. The zwitterionic stabilizer may enhance the stability of the cesium tungsten oxide nanoparticle dispersion during shipment and storage. While the zwitterionic stabilizer has an overall neutral charge, at least one area of the molecule has a positive charge (e.g., amino groups) and at least one other area of the molecule has a negative charge. The metal oxide nanoparticles may have a slight negative charge. The zwitterionic stabilizer molecules may orient around the slightly negative metal oxide nanoparticles with the positive area of the zwitterionic stabilizer molecules closest to the metal oxide nanoparticles and the negative area of the zwitterionic stabilizer molecules furthest away from the metal oxide nanoparticles. Then, the negative charge of the negative area of the zwitterionic stabilizer molecules may repel metal oxide nanoparticles from each other. The zwitterionic stabilizer molecules may form a protective layer around the metal oxide nanoparticles, and prevent them from coming into direct contact with each other and/or increase the distance between the particle surfaces (e.g., by a distance ranging from about 1 nm to about 2 nm). Thus, the zwitterionic stabilizer may prevent the metal oxide nanoparticles from agglomerating and/or settling in the dispersion.

Examples of suitable zwitterionic stabilizers include $C_2$ to $C_8$ betaines, $C_2$ to $C_8$ amino-carboxylic acids having a solubility of at least 10 g in 100 g of water, taurine, and combinations thereof. Examples of the $C_2$ to $C_8$ amino-carboxylic acids include beta-alanine, gamma-aminobutyric acid, glycine, and combinations thereof.

The zwitterionic stabilizer may be present in the dispersion in an amount ranging from about 2 wt % to about 35 wt % (based on the total wt % of the dispersion). When the zwitterionic stabilizer is the $C_2$ to $C_8$ betaine, the $C_2$ to $C_8$ betaine may be present in an amount ranging from about 8 wt % to about 35 wt % of a total wt % of dispersion. When the zwitterionic stabilizer is the $C_2$ to $C_8$ amino-carboxylic acid, the $C_2$ to $C_8$ amino-carboxylic acid may be present in an amount ranging from about 2 wt % to about 20 wt % of a total wt % of dispersion. When the zwitterionic stabilizer is taurine, taurine may be present in an amount ranging from about 2 wt % to about 35 wt % of a total wt % of dispersion. The zwitterionic stabilizer may be added to the metal oxide nanoparticles and water before, during, or after milling of the nanoparticles in the water to form the dispersion.

Jettable Composition

As mentioned above, also disclosed herein is a jettable composition. The jettable composition includes the metal oxide nanoparticle describe above a zwitterionic stabilizer; a surfactant; and a balance of water. The metal oxide nanoparticle has the formula (1) $M_mM'O_n$ wherein M is an alkali metal, m is greater than 0 and less than 1, M' is any metal, and n is greater than 0 and less than or equal to 4.

The jettable composition disclosed herein includes the metal oxide nanoparticles disclosed above, the zwitterionic stabilizer, a surfactant, and a balance of water. In some examples, the jettable composition disclosed herein includes the metal oxide nanoparticles, the zwitterionic stabilizer, a co-solvent, a surfactant, and a balance of water. In yet some other examples, the jettable composition may include additional components, such as an additive (e.g., an anti-kogation agent, a chelating agent, an antimicrobial agent, or combinations thereof).

As used herein, the terms "jettable composition vehicle," "liquid vehicle," and "vehicle" may refer to the liquid fluid in which the metal oxide nanoparticles and the zwitterionic stabilizer are placed to form the jettable composition(s). A wide variety of liquid vehicles may be used with the jettable composition set(s) of the present disclosure. The vehicle may include water alone or in combination with a variety of additional components. Examples of these additional components may include co-solvent(s), surfactant(s), antimicrobial agent(s), anti-kogation agent(s), and/or a chelating agent.

In some examples, the jettable composition includes metal oxide nanoparticles that are present in an amount ranging from about 1 wt % to about 15 wt %; zwitterionic stabilizers that are present in an amount ranging from about 2 wt % to about 35 wt %; surfactants that are present in an amount ranging from about 0.1 wt % to about 4 wt %; and co-solvents present in an amount ranging from about 2 wt % to about 80 wt % by total wt % of the jettable composition In some other examples, the jettable composition further comprising an additive selected from the group consisting of an anti-kogation agent, a chelating agent, an antimicrobial agent, and combinations thereof; wherein the additive is present in an amount ranging from about 0.01 wt % to about 20 wt % based on a total wt % of the jettable composition.

The liquid vehicle of the jettable composition includes a surfactant. The surfactant may be present in an amount ranging from about 0.1 wt % to about 4 wt % (based on the total wt % of the jettable composition). Examples of suitable surfactants are non-ionic surfactants. Some specific examples include a self-emulsifiable, nonionic wetting agent based on acetylenic diol chemistry (e.g., Surfynol® SEF from Air Products and Chemicals, Inc.), a nonionic fluorosurfactant (e.g., Capstone® fluorosurfactants from DuPont, previously known as Zonyl FSO), and combinations thereof. In other examples, the surfactant is an ethoxylated low-foam wetting agent (e.g., Surfynol® 440 or Surfynol® CT-111 from Air Products and Chemical Inc.) or an ethoxylated wetting agent and molecular defoamer (e.g., Surfynol® 420 from Air Products and Chemical Inc.). Still other suitable surfactants include non-ionic wetting agents and molecular defoamers (e.g., Surfynol® 104E from Air Products and Chemical Inc.), or water-soluble, non-ionic surfactants (e.g., Tergitol® TMN-6, Tergitol® 15S7, and Tergitol® 15S9 from The Dow Chemical Company). In some examples, an anionic surfactant may be used in combination with the non-ionic surfactant. One suitable anionic surfactant is an alkyldiphenyloxide disulfonate (e.g., Dowfax® 8390 and Dowfax® 2A1 from The Dow Chemical Company). In some examples, it may be desirable to utilize a surfactant having a hydrophilic-lipophilic balance (HLB) less than 10.

The vehicle may include a co-solvent(s). Some examples of the co-solvent that may be added to the vehicle include 1-(2-hydroxyethyl)-2-pyrrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), and combinations thereof. Whether a single co-solvent is used or a combination of co-solvents is used, the total amount of co-solvent(s) in the jettable composition may range from about 2 wt % to about 80 wt % with respect to the total wt % of the jettable composition. The co-solvent loading may be adjusted to achieve a viscosity ranging from about 0.8 cP to 5 cP.

In some examples, the liquid vehicle may also include one or more of the previously mentioned additives. To reiterate, the additive may be an anti-kogation agent, a chelating agent, an antimicrobial agent, or a combination thereof. While the amount of the additive may vary depending upon the type of additive, generally the additive may be present in the jettable composition in an amount ranging from about 0.01 wt % to about 20 wt % (based on the total wt % of the jettable composition).

As mentioned above, an anti-kogation agent may be included in the jettable composition. Kogation refers to the deposit of dried jettable composition components on a heating element of a thermal inkjet printhead. Anti-kogation agent(s) is/are included to assist in preventing the buildup of kogation. Examples of suitable anti-kogation agents include oleth-3-phosphate (e.g., commercially available as Crodafos® O3A or Crodafos® N-3 acid from Croda), or a combination of oleth-3-phosphate and a low molecular weight (e.g., <5,000) polyacrylic acid polymer. Whether a single anti-kogation agent is used or a combination of anti-kogation agents is used, the total amount of anti-kogation agent(s) in the jettable composition may range from about 0.1 wt % to about 0.2 wt % (based on the total wt % of the jettable composition).

The liquid vehicle may also include a chelating agent. The chelating agent may be included in the jettable composition to eliminate the deleterious effects of heavy metal impurities. Examples of suitable chelating agents include disodium ethylene-diaminetetraacetic acid (EDTA-Na), ethylene diamine tetra acetic acid (EDTA), and methyl-glycinediacetic acid (e.g., Trilon® M from BASF Corp.). Whether a single chelating agent is used or a combination of chelating agents is used, the total amount of chelating agent(s) in the jettable composition may range from 0 wt % to about 2 wt % based on the total wt % of the jettable composition.

The liquid vehicle may also include antimicrobial agent(s). Suitable antimicrobial agents include biocides and fungicides. Example antimicrobial agents may include the Nuosept® (Ashland Inc.), Vancide® (R.T. Vanderbilt Co.), Acticide® B20 and Acticide® M20 (Thor Chemicals), and combinations thereof. In an example, the jettable composition may include a total amount of antimicrobial agents that ranges from about 0.1 wt % to about 1 wt % (based on the total wt % of the jettable composition). In some examples disclosed herein, the vehicle of the jettable composition may also include additional dispersant(s)(e.g., a low molecular weight (e.g., <5,000) polyacrylic acid polymer, such as Carbosperse® K-7028 Polyacrylate from Lubrizol), preservative(s), jettability additive(s), and the like.

The jettable composition includes the metal oxide nanoparticles. In an example, the metal oxide nanoparticles are added to the other components (including the zwitterionic stabilizer) to form the jettable composition. In another example, the metal oxide nanoparticles are present in the previously described metal oxide nanoparticle dispersion (including the zwitterionic stabilizer), which is a separate dispersion that is added to the other components to form the jettable composition. The balance of the jettable composition is water.

In some examples, the jettable composition may also include a colorant in addition to the metal oxide nanoparticles. The amount of the colorant that may be present in the jettable composition ranges from about 1 wt % to about 10 wt % (based on the total wt % of the jettable composition). The colorant may be a pigment and/or dye having any suitable color. Examples of the colors include cyan, magenta, yellow, etc. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), H-MA magenta, H-MI magenta Direct Blue 199 (DB 199), Pro-Jet C854, H-CB cyan, or pigments, such as Pigment Blue 15:3 (PB 15:3), Pigment Red 122 (PR 122), Pigment Yellow 155 (PY 155), and Pigment Yellow 74 (PY 74). If an anionic colorant is included, the amount may be adjusted (e.g., lowered) so that the colorant does not crash out of the jettable composition.

In some examples, the jettable composition may be prepared by mixing the metal oxide nanoparticles described above, a co-solvent, a balance of water. With water included, the jettable composition may be adjusted to a pH from about 8.0 to about 8.5 with potassium hydroxide (KOH), or another suitable base. The nanoparticles may be present in an amount of from about 0.01 wt % to about 30 wt % based on the total weight of the nanoparticle aqueous ink composition. In some examples, a buffer solution can be added to the jettable composition by mixing the buffer solution into the nanoparticle aqueous ink composition.

The jettable composition can be used and applied using any known inkjet printing technique, such as, for example, continuous inkjet printing or drop-on-demand inkjet printing including, piezoelectric and thermal inkjet printing. The jettable composition may, in some instances, be used as an inkjet ink.

In some examples, the jettable composition is formulated to be used three-dimensional (3D) printing system. In some other examples, the jettable composition including the metal oxide nanoparticle described above, a zwitterionic stabilizer, a surfactant, and a balance of water is formulated to be used as a fusing agent in a three-dimensional printing system.

As one example, the jettable composition containing a metal oxide nanoparticle dispersion may be used as a fusing agent in a three-dimensional (3D) printing system, where the metal oxide nanoparticles act as a plasmonic resonance absorber. The jettable composition disclosed herein, which includes metal oxide nanoparticles and the zwitterionic stabilizer, is a liquid, and may be included in a single cartridge set or a multiple-cartridge set. In the multiple-cartridge set, any number of the multiple jettable compositions may have the metal oxide nanoparticle and the zwitterionic stabilizer incorporated therein. Examples of the three-dimensional (3D) printing method disclosed herein utilize Multi Jet Fusion Printing (MJFP). During MJFP, a layer of a build material (also referred to as build material particles) is exposed to radiation, but a selected region (in some instances less than the entire layer) of the build material is fused and hardened to become a layer of a 3D part(s) or object(s).

In the examples disclosed herein, a jettable composition comprising the nanoparticles described herein (e.g., fusing agent) can be selectively deposited in contact with the selected region of the build material. The jettable composition, or fusing agent, is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent (e.g., nanoparticles). This causes the build material to fuse, bind, or cure, to form the layer of the 3D parts or objects.

In some examples, a method of using the metal oxide nanoparticle dispersion comprise jetting the aqueous composition comprising the nanoparticle described herein to form a three-dimensional object) or parts. In some examples, a method to form three-dimensional objects or parts can include: applying a build material; pre-heating the build material to a WO2018/080630 PCT/US2017/049382 temperature ranging from about 50° C. to about 400° C.; selectively applying the jettable composition comprising metal oxide nanoparticles having the formula (1) $M_mM'O_n$ wherein M is an alkali metal, m is greater than 0 and less than 1, M' is any metal, and n is greater than 0 and less than or equal to 4; a zwitterionic stabilizer; a surfactant; and a balance of water; on at least a portion of the build material; exposing the build material and the jettable composition to infrared radiation to form the three-dimensional object(s) or part(s) by fusing the build material, and jettable composition; and repeating (i), (ii), (iii), (iv) and/or (v).

The build material can be a powder, a liquid, a paste, or a gel. Examples of build material can include semi-crystalline thermoplastic materials with a wide processing window of greater than 5° C. (e.g., the temperature range between the melting point and the re-crystallization temperature). Some specific examples of the build material can include polyamides (PAs) (e.g., PA 11/nylon 11, PA 12/nylon 12, PA 6/nylon 6, PA 8/nylon 8, PA 9/nylon 9, PA 6,6/nylon 6,6, PA 612/nylon 6,12, PA 8,12/nylon 8,12, PA 9,12/nylon 9,12, or combinations thereof). Other specific examples of the build material can include polyethylene, polyethylene terephthalate (PET), and an amorphous variation of these materials. Still other examples of suitable build materials can include polystyrene, polyacetals, polypropylene, polycarbonate, polyester, thermal polyurethanes, other engineering plastics, and blends of any two or more of the polymers listed herein. Core shell polymer particles of these materials may also be used. The build material can have a melting point ranging from about 50° C. to about 400° C. As examples, the build material may be a polyamide having a melting point of 180° C., or thermal polyurethanes having a melting point ranging from about 100° C. to about 165° C. The build material can be made up of similarly sized particles or differently sized particles. In some examples, the build material can include particles of two different sizes. The term "size," as used herein with regard to the build material, refers to the diameter of a spherical particle, or the average diameter of a non-spherical particle (e.g., the average of multiple diameters across the particle). In an example, the average size of the particles of the build material can ranges from about 0.1 µm to about 100 µm, or from about 1 µm to about 80 µm, or from about 5 µm to about 50 µm. In some examples, the build material can include, in addition to polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include Hostastat® FA 38 (natural based ethoxylated alkylamine), Hostastat® FE2 (fatty acid ester), and Hostastat® HS 1 (alkane sulfonate), each of which is available from Clariant Int. Ltd.). In an example, the charging agent is added in an amount ranging from greater than 0 wt % to less than 5 wt % based upon the total weight of the build material.

In some examples, layer(s) of the build material can be applied in a fabrication bed of a 3D printer. The applied layer(s) can be exposed to heating, which can be performed to pre-heat the build material. Thus, the heating temperature may be below the melting point of the build material. As such, the temperature selected can depend upon the build material that is used. As examples, the heating temperature may be from about 5° C. to about 50° C. below the melting point of the build material. In an example, the heating temperature can range from about 50° C. to about 400° C. In another example, the heating temperature can range from about 150° C. to about 170° C. The jettable composition comprising the nanoparticles described herein can be dispensed from an inkjet printhead, such as a thermal inkjet printhead or a piezoelectric inkjet printhead. The printhead can be a drop-on-demand printhead or a continuous drop printhead.

The infrared radiation can be emitted from a radiation source, such as an IR (e.g., near-IR) curing lamp, or IR (e.g., near-IR) light emitting diodes (LED), or lasers with specific IR or near-IR wavelengths. Any radiation source may be used that emits a wavelength in the infrared spectrum, for example near-infrared spectrum. The radiation source may be attached, for example, to a carriage that also holds the printhead(s). The carriage may move the radiation source into a position that is adjacent to the fabrication bed containing the 3D printed object(s) or part(s). The jettable composition comprising the nanoparticles described herein can enhance the absorption of the radiation, convert the absorbed radiation to thermal energy, and promote the transfer of the thermal heat to the build material in contact therewith. In an example, the ink can sufficiently elevate the temperature of the build material above the melting point(s), allowing curing (e.g., sintering, binding, or fusing) of the build material particles to take place.

EXAMPLES

In Examples 1-6, several different jettable composition and dispersion formulations comprising metal oxide nanoparticles were prepared and analyzed. The metal oxide nanoparticle tested is a cesium tungsten oxide nanoparticle (having the formula $CsWO_3$). The particle size of the cesium tungsten oxide nanoparticles was measured in each of Examples 1-6 in terms of the volume-weighted mean diameter (MV). The volume-weighted mean diameter (MV) was measured with a Nanotrac® Wave® particle size analyzer (available from Microtrac®—Nikkiso Group®). The test samples were prepared by diluting jettable composition samples [1:5000] with deionized water and analyzing the samples without further treatment. In Examples 4 and 5, the D50 (i.e., the median of the particle size distribution, where ½ the population is above this value and ½ is below this value) and the D95 (i.e., 95% the population is below this value) were also determined using the particle size analyzer. Also in Examples 4 and 5, the particle size was measured using an Accusizer A 2000 (from PSS), which counts particles and determines the number of particles of a particular size that are present in 1 mL of the sample. In Example 7, the particle size measurements were made using a Horiba® LA-950 particle size analyzer.

Example 1

This example was performed to determine whether the stability of the dispersion was affected by jettable composition additives. The metal oxide nanoparticle (Cesium tungsten) oxide was obtained in milled form as a dispersion in water, from Sumitomo Mining and Manufacturing Company (Sumitomo). The as-received cesium tungsten oxide dispersion did not contain any stabilizing additives, and volume-weighted mean diameter of the particles in the dispersion was determined to be 5 nm. The cesium tungsten oxide dispersion was incorporated into 14 different formulations (F1-F14). Each formulation contained 8 wt % of the cesium tungsten oxide nanoparticles. The general components of each formulation, in addition to the 8 wt % of cesium tungsten oxide, are shown in Table 1. Each formulation was stored in a closed vial in an Accelerated Atorage (AS) environment at a temperature of 60° C. for 19 days. The particle size (volume-weighted mean diameter) and the formulation appearance were tracked with time. The particle size and formulation appearance results after the formulations were stored in the AS environment are shown in Table 1. A particle size was not recorded for the formulations that phase separated into two layers or the formulations that precipitated the cesium tungsten oxide.

TABLE 1

| ID | Formulation | Appearance | Particle Size (MV, nm) |
|---|---|---|---|
| F1 | 2-pyrrolidinone 20.00 wt % Crodafos ® O3A 0.50 wt % Surfynol ® SEF 0.75 wt % Capstone ® FS-35 0.05 wt % Carbosperse ® K-7028 0.01 wt % Trilon ® M 0.04 wt % Proxel ® GXL 0.18 wt % Kordek ® MLX 0.14 wt % Cesium tungsten oxide 8 wt % Water balance | Phase separated, 2 layers | — |
| F2 | 2-pyrrolidinone 32.00 wt % 2-methyl-1,3-propanediol 18.00 wt % Tergitol ® 15S7 1.90 wt % Capstone ® FS-35 0.82 wt % Cesium tungsten oxide 8 wt % Water balance | Loose gel | 126 |
| F3 | Betaine (i.e., $C_2$ betaine) 10 wt % Cesium tungsten oxide 8 wt % Water balance | Stable | 4.3 |
| F4 | Tris buffer 1 wt % Cesium tungsten oxide 8 wt % Water balance | Phase separated, 2 layers | — |
| F5 | Styrene-maleic anhydride copolymer, produced by Cray Valley Company 5 wt % Cesium tungsten oxide 8 wt % Water balance | Phase separated immediately | — |
| F6 | Floquat ® 2350 polymer (SNF) 4 wt % Cesium tungsten oxide 8 wt % Water balance | Immediate precipitate | — |
| F7 | Triethanolamine 3 wt % Cesium tungsten oxide 8 wt % Water balance | Phase separated, 2 layers | — |
| F8 | 2-(N-morpholino) ethanesulfonic acid (buffer) 1 wt % Cesium tungsten oxide 8 wt % Water balance | Loose gel | 46 |
| F9 | Kordek ® 0.1 wt % Cesium tungsten oxide 8 wt % Water balance | Stable | 5 |
| F10 | Proxel ® GXL 0.1 wt % Cesium tungsten oxide 8 wt % Water balance | Loose precipitate at the bottom | 12 |
| F11 | Triton ® M 1 wt % Cesium tungsten oxide 8 wt % Water balance | Immediate precipitate | — |
| F12 | 1-(2-Hydroxyethyl)-2-pyrrolidone 50 wt % Cesium tungsten oxide 8 wt % Water balance | Loose gel | 35 |

TABLE 1-continued

| ID | Formulation | Appearance | Particle Size (MV, nm) |
|---|---|---|---|
| F13 | 2-pyrrolidinone 50 wt % Tergitol ® 15S30 0.1 wt % Cesium tungsten oxide 8 wt % Water balance | Loose gel | 78 |
| F14 | 1-(2-Hydroxyethyl)2-pyrrolidone 50 wt % Tergitol ® 15S30 0.1 wt % Cesium tungsten oxide 8 wt % Water balance | Loose gel | 43 |

As shown in Table 1, the cesium tungsten oxide dispersion was stable in formulation F3 containing betaine, an example of the zwitterionic stabilizer. The results in Table 1 also illustrate that the cesium tungsten oxide dispersion had relatively poor stability with the other solvents and additives tested. While formulation F9 containing Kordek® alone was stable, formulation F1 containing in Kordek DEK® in combination with other jettable composition components (i.e., 2-pyrrolidinone, Crodafos® O3A, Surfynol® SEF, Capstone® FS-35, Carbosperse® K-7028, Trilon® M, and Proxel® GXL) phase separated into two layers.

Example 2

Seven examples of the jettable composition (labeled Ink 2, Ink 3, Ink 4, Ink 5, Ink 6, Ink 8, and Ink 10) were prepared with betaine as the zwitterionic stabilizer. Four comparative jettable compositions (labeled Ink 1, Ink 7, Ink 9, and Ink 11) were also prepared. The comparative jettable compositions contained no stabilizer. The general formulations of the example and comparative jettable compositions are shown in Table 2, with the wt % of each component that was used.

TABLE 2

| Component | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|
| 1-(2-Hydroxyethyl)-2-pyrrolidone | 50 | 45 | 40 | 30 | 20 | 0 | 20 | 0 | 10 | 10 | 0 |
| Betaine | 0 | 5 | 10 | 15 | 20 | 20 | 0 | 33 | 0 | 10 | 0 |
| Cesium tungsten oxide | 8 | 8 | 8 | 8 | 8 | 8 | 8 | 8 | 8 | 8 | 8 |
| Water | 42 | 42 | 42 | 47 | 52 | 72 | 72 | 59 | 82 | 72 | 92 |

Each example and comparative jettable composition was stored in an AS environment at a temperature of 60° C. The particle size in terms of the volume-weighted mean diameter for each example and comparative jettable composition was measured immediately after preparation (week 0) and after 1, 2, and 4 weeks in the AS environment. The particle size differential was calculated for each example and comparative jettable composition using the particle sizes immediately after preparation and after 4 weeks in the AS environment. The particle size for each example and comparative jettable composition immediately after preparation and after 1, 2, and 4 weeks in the AS environment and the particle size differential are shown in Table 3. A particle size after 4 weeks in the AS environment was not recorded for the Ink 9 because the cesium tungsten oxide particles had settled.

TABLE 3

| Jettable Composition ID | Particle size immediately after preparation (MV, nm) | Particle size after 1 week AS (MV, nm) | Particle size after 2 weeks AS (MV, nm) | Particle size after 4 weeks AS (MV, nm) | Particle size differential (week 0/week 4) |
|---|---|---|---|---|---|
| Ink 1 | 5.89 | 6.73 | 20.35 | 55.2 | 49.31 |
| Ink 2 | 5.14 | 5.36 | 5.97 | 22.45 | 17.31 |
| Ink 3 | 5.86 | 4.86 | 5.06 | 5.51 | −0.35 |
| Ink 4 | 4.68 | 4.31 | 4.76 | 4.63 | −0.05 |
| Ink 5 | 5.74 | 3.96 | 4.26 | 4.4 | −1.34 |
| Ink 6 | 4.9 | 3.74 | 4.27 | 4.1 | −0.8 |
| Ink 7 | 5.61 | 6.63 | 7.53 | 85.2 | 79.59 |
| Ink 8 | 5.56 | 3.4 | 3.65 | 3.73 | −1.83 |
| Ink 9 | 5.94 | 6.23 | 7.11 | N/A | N/A |
| Ink 10 | 6.24 | 4.49 | 4.88 | 6.5 | 0.26 |
| Ink 11 | 6.29 | 5.8 | 6.81 | 8.47 | 2.18 |

The results shown in Table 3 indicate that 1-(2-hydroxyethyl)-2-pyrrolidone alone destabilizes the cesium tungsten oxide dispersion and betaine stabilizes the cesium tungsten oxide dispersion (compare, e.g., Inks 1, 7 and 9 with Inks 6 and 8). The results in Table 3 illustrate that when a combination of 1-(2-hydroxyethyl)-2-pyrrolidone and betaine are used, better stabilization is obtained when the betaine is present in an amount of at least 10 wt % c. Table 3 further shows that the example jettable compositions containing at least 10 wt % betaine (which corresponds to at least a 1:1 weight ratio of betaine to the cesium tungsten oxide) have a particle size change of 1% or less after 4 weeks.

Example 3

Another seven examples of the jettable composition (labeled Inks 12-18) were prepared with either beta-alanine or betaine as the zwitterionic stabilizer. Inks 15 and 16 were prepared by adding beta-alanine during the milling of the cesium tungsten oxide. Inks 12, 13, 14, and 18 were prepared by adding beta-alanine after milling the cesium tungsten oxide. Ink 17 was prepared by adding betaine after milling the cesium tungsten oxide. The general formulations of the example jettable compositions are shown in Table 4, with the wt % of each component that was used.

TABLE 4

| Component | Ink 12 | Ink 13 | Ink 14 | Ink 15 | Ink 16 | Ink 17 | Ink 18 |
|---|---|---|---|---|---|---|---|
| Cesium tungsten oxide | 8 | 8 | 8 | 8 | 8 | 8 | 8 |
| 2-pyrrolidinone | 20 | 20 | 20 | 20 | 20 | 20 | 20 |
| Crodafos ® O3A | 0.5 | 0.5 | 0.5 | 0.5 | 0.5 | 0.5 | 0.5 |
| Surfynol ® SEF | 0.75 | 0.75 | 0.75 | 0.75 | 0.75 | 0.75 | 0.75 |
| Carbosperse ® k-7028 | 0.01 | 0.01 | 0.01 | 0.01 | 0.01 | 0.01 | 0.01 |
| Dowfax ® 8390 | 0.1 | 0.1 | 0.1 | 0.1 | 0.1 | 0.1 | 0.1 |
| Trilon ® m | 0.04 | 0.04 | 0.04 | 0.04 | 0.04 | 0.04 | 0.04 |
| Proxel ® gxl | 0.18 | 0.18 | 0.18 | 0.18 | 0.18 | 0.18 | 0.18 |
| Kordek ® mlx | 0.14 | 0.14 | 0.14 | 0.14 | 0.14 | 0.14 | 0.14 |
| Beta-alanine | 3 | 5 | 8 | 4 | 2 | 0 | 5 |
| Betaine | 0 | 0 | 0 | 0 | 0 | 8 | 0 |
| Water | balance | balance | balance | balance | balance | balance | balance |

Each example jettable composition was stored in an AS environment at a temperature of 60° C. The volume-weighted mean diameter of the cesium tungsten oxide nanoparticles for each example jettable composition was measured after preparation and after 1, 2, 4, and 6 weeks in the AS environment.

The results of these measurements are shown in FIG. 1. The volume-weighted mean diameter values (MV, μm) are along the Y axis, and the X axis illustrates the jettable composition (the bars from the left to the right for each jettable composition represent the respective jettable composition after 0 weeks, 1 week, 2 weeks, 4 weeks, and 6 weeks of AS). FIG. 1 shows that beta-alanine can stabilize the cesium tungsten oxide at a lower wt % (and at a lower weight ratio) than betaine. FIG. 1 further shows that both beta-alanine and betaine are able to stabilize the cesium tungsten oxide growth in examples of the jettable composition in the presence of solvents and additives. Inks 16 and 17 were able to provide stabilizing action for about 1 week; Ink 12 was able to provide stabilizing action for about 2 weeks; Inks 13, 15, and 18 were able to provide stabilizing action for about 4 weeks; and Ink 14 was able to provide stabilizing action for about 6 weeks. It is noted that while Carbosperse® K-7028 was included in the formulations of Inks 12-18, it is believed that its presence did not affect the stabilization of the jettable compositions.

Example 4

Another two examples of the jettable composition (labeled Inks 19 and 20) were prepared with betaine as the zwitterionic stabilizer. The general formulations of the example jettable compositions are shown in Table 5, with the wt % of each component that was used.

TABLE 5

| Component | Ink 19 | Ink 20 |
|---|---|---|
| 1-(2-hydroxyethyl)-2-pyrrolidone | 25 | 25 |
| TERGITOL ® 15S30 | 0.2 | 0.2 |
| Betaine | 10 | 1 |
| Cesium tungsten oxide | 8 | 8 |
| Water | balance | balance |

Each example jettable composition was stored in an AS environment at a temperature of 60° C. The particle size for each example jettable composition was measured after preparation, after 1 week, and after 2 weeks in the AS environment. In this Example, several particle size measurements were made, including: volume-weighted mean diameter (MV, in μm), 50% (D50, 50% of the particles below this size) in μm, 95% (D95, 95% of the particles are below this size) in μm, total # of particles/mL≥0.5 μm, and total # of particles/mL≥1 μm. The particle size change was calculated for each example jettable composition using the particle sizes after preparation and after 2 weeks in the AS environment. The results of the particle size measurements for Ink 19 are shown in Table 6, and the results of the particle size measurements for Ink 20 are shown in Table 7.

TABLE 6

| Particle size | After preparation | After 1 week AS | After 2 weeks AS | Change after 2 weeks AS (%) |
|---|---|---|---|---|
| MV in μm | 0.0061 | 0.0048 | 0.0047 | 0.78 |
| 50% in μm | 0.0049 | 0.0040 | 0.0039 | 0.78 |
| 95% in μm | 0.0121 | 0.0098 | 0.0097 | 0.81 |
| Total # of particles/mL ≥ 0.5 μm | 14,600,000 | 12,300,000 | 12,700,000 | 0.87 |
| Total # of particles/mL ≥ 1 μm | 146,000 | 171,000 | 169,000 | 1.16 |

TABLE 7

| Particle size | After preparation | After 1 week AS | After 2 weeks AS | Change after 2 weeks AS (%) |
|---|---|---|---|---|
| MV in μm | 0.0065 | 0.0086 | 0.0093 | 1.43 |
| 50% in μm | 0.0052 | 0.0067 | 0.0071 | 1.36 |

TABLE 7-continued

| Particle size | After preparation | After 1 week AS | After 2 weeks AS | Change after 2 weeks AS (%) |
|---|---|---|---|---|
| 95% in μm | 0.0013 | 0.0176 | 0.0195 | 14.50 |
| Total # of particles/mL ≥ 0.5 μm | 9,930,000 | 10,600,000 | 10,700,000 | 1.08 |
| Total # of particles/mL ≥ 1 μm | 208,000 | 287,000 | 373,000 | 1.80 |

Tables 6 and 7 show that Ink 19, which contained 10 wt % betaine (which corresponds to a 1.25:1 weight ratio of betaine to the cesium tungsten oxide), stabilized the cesium tungsten oxide better than Ink 20, which contained 1 wt % betaine (which corresponds to a 1:8 weight ratio of betaine to the cesium tungsten oxide).

Figure 2:
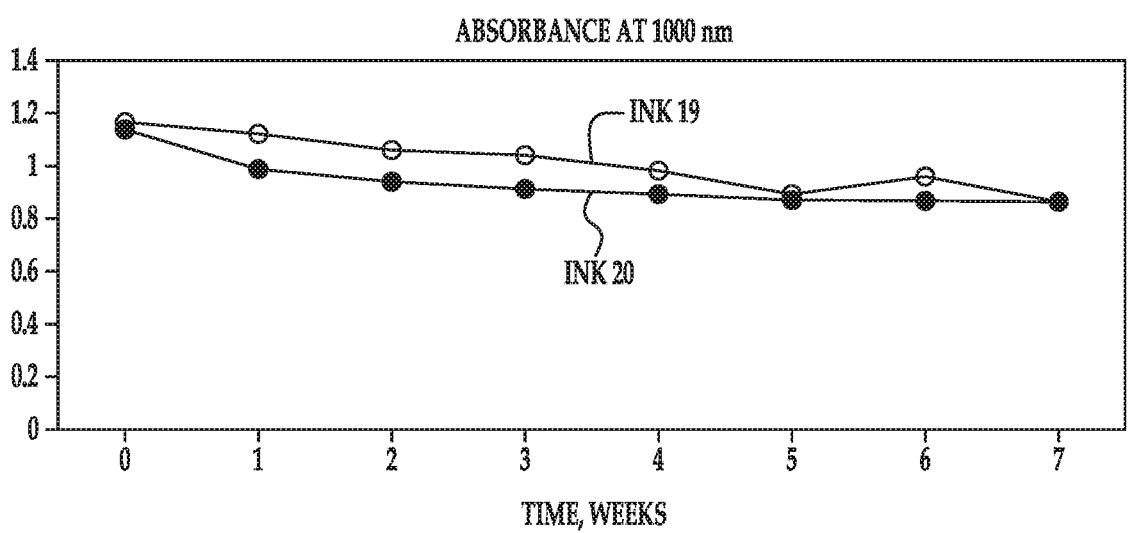
FIG. 2 is a graph illustrating the absorbance (Y axis, Absorbance units (AU) at 1:1000 dilution in water and a 1 cm light path) at a wavelength of 1,000 nm of example compositions as a function of time (weeks, X axis) in an accelerated storage (AS) environment.

Inks 19 and 20 (at 1:500 dilution with water) were also tested for absorbance at a wavelength of 1,000 nm after preparation, and after 1, 2, 3, 4, 5, 6, and 7 weeks in the AS environment at 60° C. The results of the absorbance measurements are shown in FIG. 2. The absorbance values are along the Y axis, and the X axis indicates the amount of time (weeks) the jettable composition was stored in the AS environment. FIG. 2 shows that the higher concentration of betaine in Ink 19 slowed the decrease in absorbance (as compared to Ink 20).

Example 5

Three cesium tungsten oxide dispersions, containing 20 wt % of cesium tungsten oxide and no stabilizing additives, were obtained. No changes were made to the first dispersion (labeled Dispersion 1). 20 wt % of water was added to the second dispersion (labeled Dispersion 2). 20 wt % of dry beta-alanine was added to the third dispersion (labeled Dispersion 3) under constant milling until the beta-alanine was fully dissolved. The general formulations of the final dispersions are shown below in Table 8, with the wt % of each component that was used.

TABLE 8

| Component | Dispersion 1 | Dispersion 2 | Dispersion 3 |
|---|---|---|---|
| Cesium tungsten oxide | 20 | 16 | 16 |
| Beta-Alanine | 0 | 0 | 20 |
| Water | balance | balance | balance |

Each dispersion was put through a T-cycle. During the T-cycle, each dispersion was heated to and maintained at a high temperature of 70° C. for a few minutes, and then each dispersion was cooled to and maintained at a low temperature of −40° C. for a few minutes. This process was repeated for each dispersion for 5 cycles. For each dispersion, viscosity, pH, and particle size (MV in μm, 50% in μm, 95% in μm, total # of particles/mL≥0.5 μm, and total # of particles/mL≥1 μm) was measured before and after the T-cycle, and the change ratio (after/before) for each set of measurements was calculated. The results for Dispersion 1 are shown in Table 9, the results for Dispersion 2 are shown in Table 10, and the results for Dispersion 3 are shown in Table 11.

TABLE 9

| Measurement | Before T-cycle | After T-cycle | Ratio |
|---|---|---|---|
| Viscosity in cP | 1.5 | 0.8 | 0.5 |
| pH | 4.22 | 4.42 | n/a |
| MV in μm | 0.00341 | 0.0475 | 13.9 |
| 50% in μm | 0.00280 | 0.02653 | 9.5 |
| 95% in μm | 0.00686 | 0.1573 | 22.9 |
| Total # of particles/mL ≥ 0.5 μm | 13,700,000 | 341,000,000 | 25.0 |
| Total # of particles/mL ≥ 1 μm | 59,700 | 11,800,000 | 198.3 |

TABLE 10

| Measurement | Before T-cycle | After T-cycle | Ratio |
|---|---|---|---|
| Viscosity in cP | 1.3 | 0.8 | 0.6 |
| pH | 4.36 | 4.42 | n/a |
| MV in μm | 0.00372 | 0.01833 | 4.9 |
| 50% m μm | 0.00337 | 0.01233 | 3.7 |
| 95% in μm | 0.00752 | 0.0510 | 6.8 |
| Total # of particles/mL ≥ 0.5 μm | 11,600,000 | 548,000,000 | 47.3 |
| Total # of particles/mL ≥ 1 μm | 54,000 | 27,400,000 | 506.9 |

TABLE 11

| Measurement | Before T-cycle | After T-cycle | Ratio |
|---|---|---|---|
| Viscosity in cP | 3.0 | 3.1 | 1.0 |
| pH | 6.64 | 6.64 | n/a |
| MV in μm | 0.00274 | 0.00212 | 0.8 |
| 50% in μm | 0.00224 | 0.00174 | 0.8 |
| 95% in μm | 0.00558 | 0.00424 | 0.8 |
| Total # of particles/mL ≥ 0.5 μm | 15,900,000 | 22,800,000 | 1.4 |
| Total # of particles/mL ≥ 1 μm | 5,150,000 | 4,570,000 | 0.9 |

Tables 9-11 show that Dispersion 3, which contained 20 wt % beta-alanine, had improved stabilization compared to Dispersions 1 and 2. The improved stabilization of Dispersion 3 was also seen in the appearances of the dispersions. Dispersion 3 stayed as one phase, while Dispersions 1 and 2 separated into two layers. It is noted that the viscosity measurements after T-cycle for Dispersions 1 and 2 were of the upper layer of the separated dispersions.

Example 6

Figure 3:
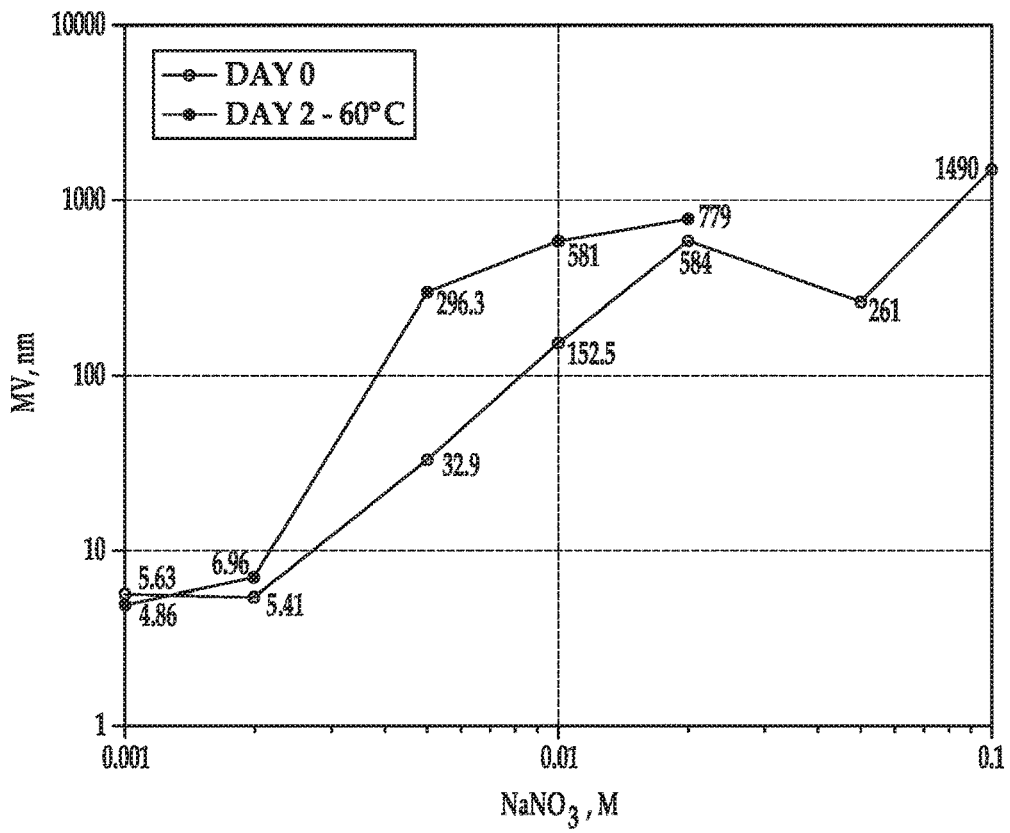
FIG. 3 is a graph illustrating the effect of $NaNO_3$ concentration (M, X axis) on the volume-weighted mean diameter (MV, in nm, Y axis) of metal oxide nanoparticles in aqueous dispersions.

The impact of the addition of small amounts of salt (NaNO$_3$) on the volume-weighted mean diameter (MV, in nm) of cesium tungsten oxide in dispersions containing 8 wt % of cesium tungsten oxide (prior to the addition of the salt) and no stabilizing additives was tested. The effect on the volume-weighted mean diameter was measure immediately after the addition of the salt and after 2 days in a 60° C. AS environment. The particle sizes of the cesium tungsten oxide in the dispersion were measured. The results of these measurements are shown in FIG. 3. The volume-weighted mean diameter values (MV, nm) are along the Y axis, and the X axis indicates the amount of NaNO$_3$ (M) added to the dispersions. FIG. 3 shows that the presence of >0.002M of the monovalent cation salt in the cesium tungsten oxide leads to almost instant increase of measured particle size. As such, FIG. 3 shows that a salt shock test is a very efficient way to test additive(s) for their capability of improving cesium tungsten oxide dispersion stability.

Three additional cesium tungsten oxide dispersions (labeled Dispersions 4-6) were prepared. The general formulations of the dispersions, prior to the addition of salt, are shown below in Table 12, with the wt % of each component that was used.

TABLE 12

| Component | Dispersion 4 | Dispersion 5 | Dispersion 6 |
|---|---|---|---|
| Cesium tungsten oxide | 8 | 8 | 8 |
| Betaine | 0 | 4 | 8 |
| Water | balance | balance | balance |

Figure 4:
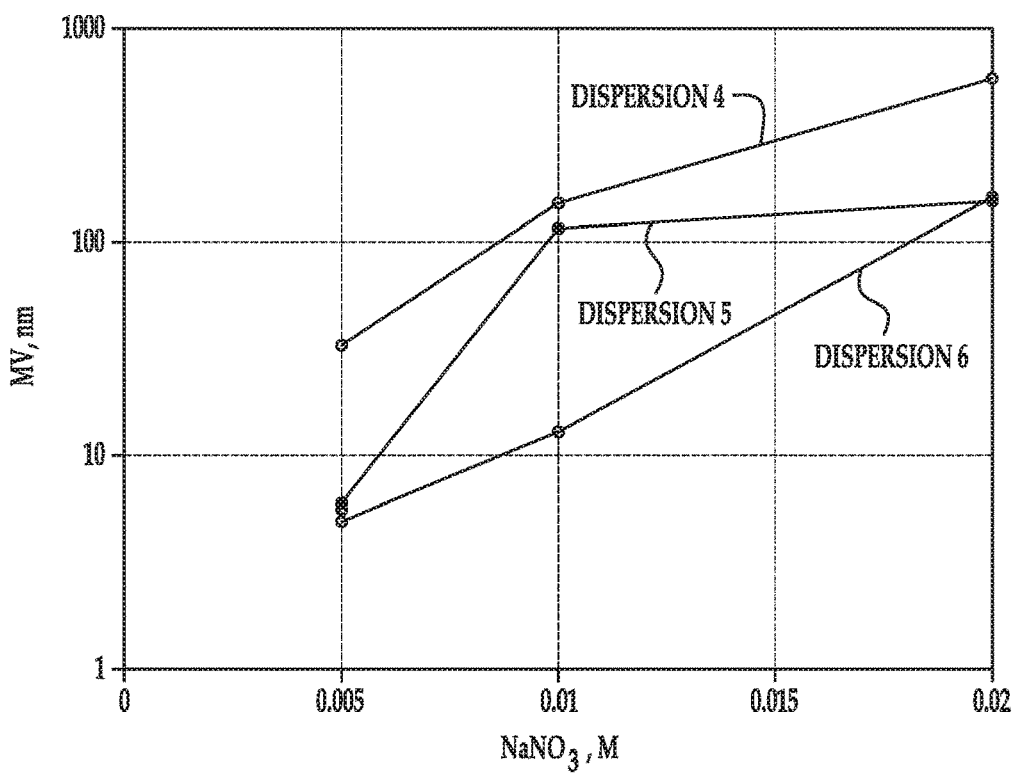
FIG. 4 is a graph illustrating the effect of $NaNO_3$ concentration (M, X axis) on the volume-weighted mean diameter (MV, in nm, Y axis) of metal oxide nanoparticles in further aqueous dispersions.

Then a NaNO$_3$ stock solution was progressively added (to achieve concentrations of 0.005 M, 0.01 M, and 0.02 M) with subsequent sonication to the dispersions. Again, the particle sizes of the cesium tungsten oxide in the dispersions were measured. The results of these measurements are shown in FIG. 4. The volume-weighted mean diameter values (MV, nm) are along the Y axis, and the X axis indicates the amount of NaNO$_3$ (M) added to the dispersions. FIG. 4 shows that both Dispersion 5 (which corresponds to a 1:2 weight ratio of betaine to the cesium tungsten oxide) and Dispersion 6 (which corresponds to a 1:1 weight ratio of betaine to the cesium tungsten oxide) can tolerate NaNO$_3$ at and below a concentration of 0.005 M. FIG. 4 further shows that Dispersion 6 begins to show signs of destabilization when the NaNO$_3$ concentration is close to 0.01 M.

Three more cesium tungsten oxide dispersions (labeled Dispersion 7-9) were prepared. The general formulations of the dispersions, prior to the addition of salt, are shown below in Table 13, with the wt % of each component that was used.

TABLE 13

| Component | Dispersion 7 | Dispersion 8 | Dispersion 9 |
|---|---|---|---|
| Cesium tungsten oxide | 8 | 8 | 8 |
| Betaine | 0 | 8 | 0 |
| Beta-Alanine | 0 | 0 | 8 |
| Water | balance | balance | balance |

Figure 5:
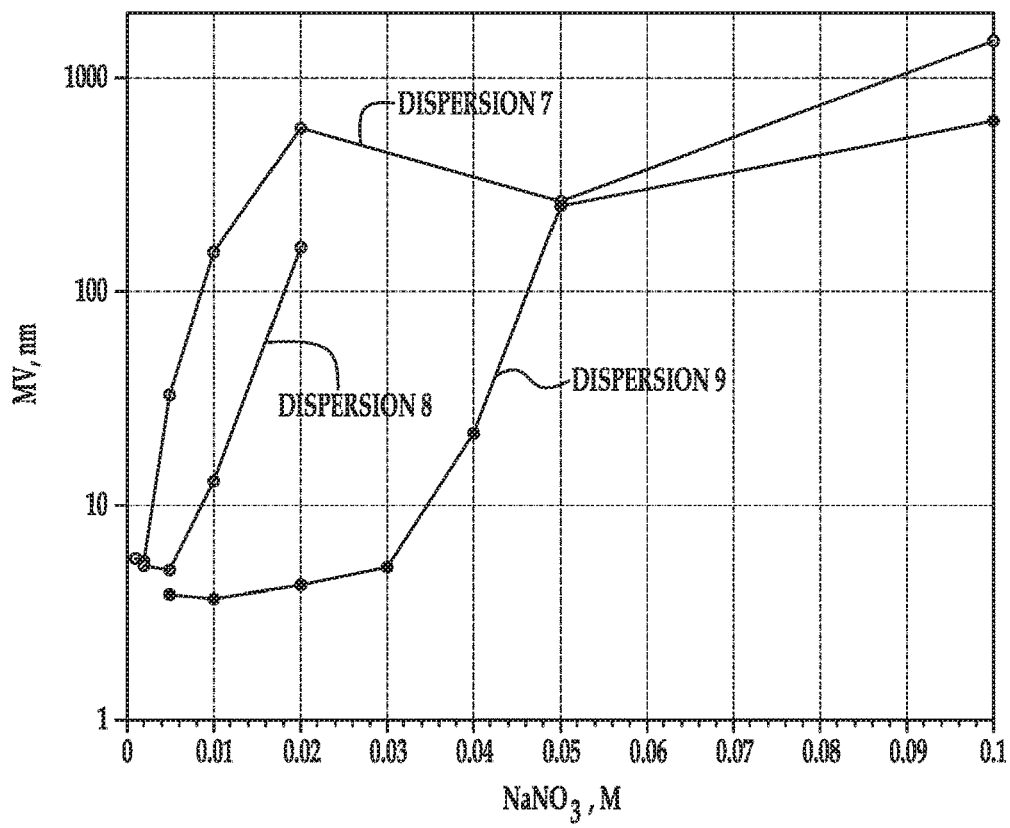
FIG. 5 is a graph illustrating the effect of $NaNO_3$ concentration (M, X axis) on the volume-weighted mean diameter (MV, in nm, Y axis) of metal oxide nanoparticles in still further aqueous dispersions.

Then a NaNO$_3$ stock solution was progressively added with subsequent sonication to the dispersions. Again, the particle sizes of the cesium tungsten oxide in the dispersions were measured. The results of these measurements are shown in FIG. 5. The volume-weighted mean diameter values (MV, nm) are along the Y axis, and the X axis indicates the amount of NaNO$_3$ (M) added to the dispersions. FIG. 5 shows that Dispersion 9 (which corresponds to a 1:1 weight ratio of beta-alanine to the cesium tungsten oxide) can tolerate NaNO$_3$ at and below a concentration of 0.003 M.

Example 7

Pre-mill cesium tungsten oxide concentrate, containing 50 wt % of cesium tungsten oxide, was obtained. The mean particle size (measured by using a HORIBA® LA-950 particle size analyzer) was about 35 μm. Three additional cesium tungsten oxide dispersions (labeled Dispersion 10-12) were prepared. The general formulations of the dispersions are shown below in Table 14, with the wt % c of each component that was used.

TABLE 14

| Component | Dispersion 10 | Dispersion 11 | Dispersion 12 |
|---|---|---|---|
| Cesium tungsten oxide | 20 | 20 | 20 |
| Beta-Alanine | 0 | 25 | 50 |
| Water | balance | balance | balance |

Figure 6:
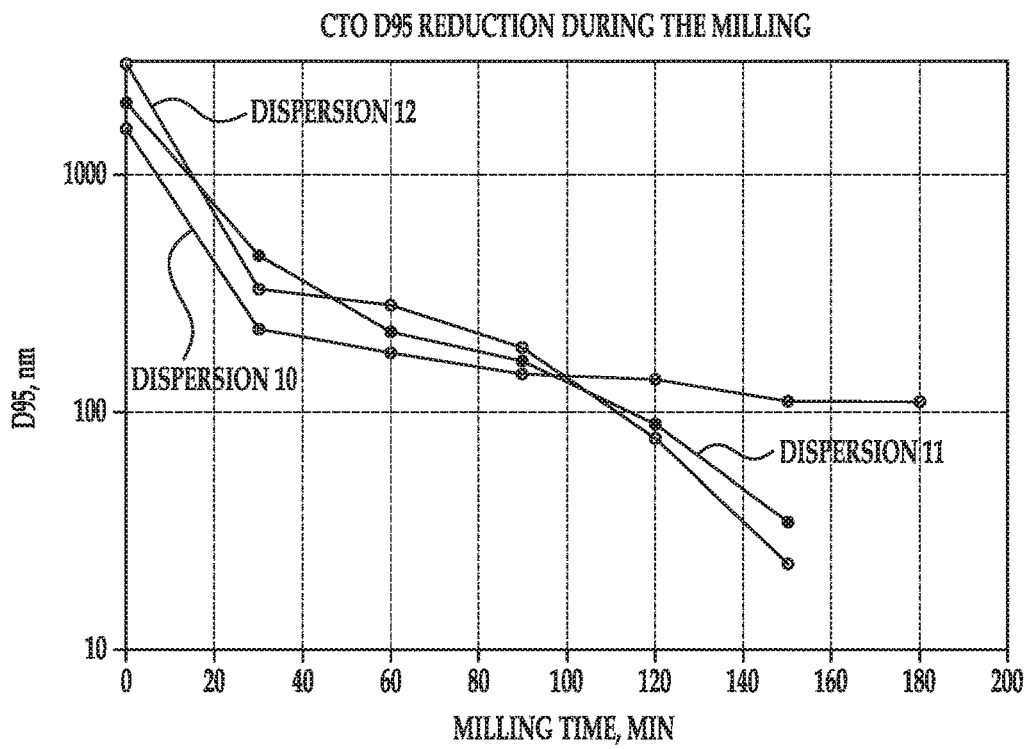
FIG. 6 is a graph illustrating the effect of milling time (minutes, X axis) on the D95 particle size (nm, Y axis) of metal oxide nanoparticles in aqueous dispersions.

Then 500 g of each of the dispersions was milled using a MINICER® bead mill (available from NETZSCH®) and 300 μm zirconia and YTZ® beads at a rotor speed of 1750 rpm. The duration of the milling was 150 minutes for Dispersion 10, and 180 minutes for Dispersions 11 and 12. The D95 particle size of cesium tungsten oxide was measured for each dispersion after milling for 0 minutes, 30 minutes, 60 minutes, 90 minutes, 120 minutes, and 150 minutes. The D95 particle size of cesium tungsten oxide was measured for Dispersion 10 was also measured after 180 minutes. The results of these measurements are shown in FIG. 6. The D95 particle size values (nm) are along the Y axis, and the X axis indicates the milling time (minutes). FIG. 6 shows that Dispersion 10 still had a D95 particle size of 111 nm after 180 minutes of milling, while Dispersion 11 had a D95 particle size of 17.5 nm after 150 minutes of milling, and Dispersion 12 had a D95 particle size of 18.9 nm after 150 minutes of milling. Additionally, the volume-weighted mean diameter of cesium tungsten oxide was measured for each dispersion after milling. The volume-weighted mean diameter of Dispersion 10 was about 25 nm after 180 minutes of milling. The volume-weighted mean diameter of Dispersion 11 was about 9.9 nm after 150 minutes of milling, and the volume-weighted mean diameter of Dispersion 12 was about 10.1 nm after 150 minutes of milling. Thus, the presence of beta-alanine significantly reduced both the volume-weighted mean diameter and the D95 particle size of cesium tungsten oxide.

It is believed that the cesium tungsten oxide dispersions in examples 5-7 disclosed herein would, when incorporated into an example of the jettable composition disclosed herein, behave in the same manner or in a substantially similar manner as they did in these examples.

It is to be understood that the ranges provided herein include the stated range and any value or sub-range within the stated range. For example, a range from about 2 wt % to about 35 wt % should be interpreted to include not only the explicitly recited limits of from about 2 wt % to about 35 wt %, but also to include individual values, such as 3.35 wt %, 5.5 wt %, 17.75 wt %, 28.85 wt %, etc., and sub-ranges, such as from about 3.35 wt % to about 16.5 wt %, from about 2.5 wt % to about 27.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. In describing and claiming the examples disclosed herein, the singular forms "a", "an", and "the" include plural referents unless the context clearly dictates otherwise. While several examples have been described in detail, it is to be understood that the disclosed examples may be modified. Therefore, the foregoing description is to be considered non-limiting.

The invention claimed is:

1. A dispersion, comprising:
   a. a metal oxide nanoparticle having the formula (1) $M_mM'O_n$
      i. wherein M is an alkali metal,
      ii. m is greater than 0 and less than 1,
      iii. M' is any metal,
      iv. and n is greater than 0 and less than or equal to 4, wherein the metal oxide nanoparticle has an average particle size ranging from about 1 nm to about 40 nm and is present in an amount ranging from about 1 wt % to about 15 wt %;
   b. a zwitterionic stabilizer present in an amount ranging from about 2 wt % to about 35 wt %; and
   c. a balance of water.

2. The dispersion of claim 1 wherein, the metal oxide nanoparticle absorbs infrared light in a range of from about 750 nm to about 2300 nm.

3. The dispersion of claim 1 wherein, in the metal oxide nanoparticle having the formula (1) $M_mM'O_n$, M is lithium (Li), sodium (Na), potassium (K), rubidium (Rb), cesium (Cs), or mixtures thereof.

4. The dispersion of claim 1 wherein, in the metal oxide nanoparticle having the formula (1) $M_mM'O_n$, M is cesium (Cs).

5. The dispersion of claim 1 wherein, in the metal oxide nanoparticle having the formula (1) $M_mM'O_n$, M' is tungsten (W), molybdenum (Mb), tantalum (Ta), hafnium (Hf), cerium (Ce) lanthanum (La), or mixtures thereof.

6. The dispersion of claim 1 wherein, in the metal oxide nanoparticle having the formula (1) $M_mM'O_n$, M' is tungsten (W).

7. The dispersion of claim 1 wherein, in the metal oxide nanoparticle having the formula (1) $M_mM'O_n$, M' is tungsten (W), n is 3 and M is lithium (Li), sodium (Na), potassium (K), rubidium (Rb), cesium (Cs), or mixtures thereof.

8. The dispersion of claim 1 wherein, in the metal oxide nanoparticle having the formula (1) $M_mM'O_n$, M is cesium (Cs), m is 0.33, M' is tungsten (W), and n is greater than 0 and less than or equal to 3.

9. The dispersion of claim 1 wherein a weight ratio of the metal oxide nanoparticle to the zwitterionic stabilizer is 1:1.

10. The dispersion of claim 1 wherein the zwitterionic stabilizer is selected from the group consisting of a $C_2$ to $C_8$ betaine, a $C_2$ to $C_8$ amino-carboxylic acid having a solubility of at least 10 g in 100 g of water, taurine, and combinations thereof.

11. The dispersion as defined in claim 10 wherein the zwitterionic stabilizer is the $C_2$ to $C_8$ betaine and is present in an amount ranging from about 8 wt % to about 35 wt % of a total wt % of the dispersion such that a weight ratio of the metal oxide nanoparticle to the $C_2$ to $C_8$ betaine ranges from 1:1 to 1:2.

12. The dispersion as defined in claim 10 wherein the zwitterionic stabilizer is the $C_2$ to $C_8$ amino-carboxylic acid, and the $C_2$ to $C_8$ amino-carboxylic acid is beta alanine; and the metal oxide nanoparticles and the beta-alanine are present at a weight ratio ranging from 1:1 to 1:2.

13. A jettable composition comprising:
   a. metal oxide nanoparticles having the formula (1)) $M_mM'O_n$
      i. wherein M is an alkali metal,
      ii. m is greater than 0 and less than 1,
      iii. M' is any metal,
      iv. and n is greater than 0 and less than or equal to 4, wherein the metal oxide nanoparticle has an average particle size ranging from about 1 nm to about 40 nm and is present in an amount ranging from about 1 wt % to about 15 wt %;
   b. a zwitterionic stabilizer present in an amount ranging from about 2 wt % to about 35 wt %;
   c. a surfactant present in an amount ranging from about 0.1 wt % to about 4 wt %; and
   d. a balance of water.

14. The jettable composition as defined in claim 13, further comprising:
   a co-solvent is present in an amount ranging from about 2 wt % to about 80 wt % by a total wt % of the jettable composition.

15. The jettable composition as defined in claim 13, further comprising an additive selected from the group consisting of an anti-kogation agent, a chelating agent, an antimicrobial agent, and combinations thereof; wherein the additive is present in an amount ranging from about 0.01 wt % to about 20 wt % based on a total wt % of the jettable composition.

16. The dispersion of claim 1 wherein:
   the zwitterionic stabilizer is a $C_2$ to $C_8$ amino-carboxylic acid is selected from the group consisting of beta-alanine, gamma-aminobutyric acid, glycine, and combinations thereof, and the $C_2$ to $C_8$ amino-carboxylic acid is present in an amount ranging from about 2 wt % to about 20 wt % of a total wt % of the dispersion; or
   the zwitterionic stabilizer is taurine and is present in an amount ranging from about 2 wt % to about 35 wt % of a total wt % of the dispersion.

17. The dispersion of claim 1, wherein:
   the zwitterionic stabilizer is $C_2$ betaine; and
   the dispersion further comprises 1-(2-hydroxyethyl)-2-pyrrolidone present in an amount ranging from about 10 wt % to about 45 wt %.

18. The jettable composition of claim 13, wherein:
   the zwitterionic stabilizer is $C_2$ betaine;
   a weight ratio of the metal oxide nanoparticle to the $C_2$ betaine is 1:1.25; and
   the jettable composition further comprises 1-(2-hydroxyethyl)-2-pyrrolidone present in an amount of about 25 wt %.

19. The jettable composition of claim 13 wherein the zwitterionic stabilizer is a $C_2$ to $C_8$ amino-carboxylic acid that is selected from the group consisting of beta-alanine, gamma-aminobutyric acid, glycine, and combinations thereof; and the $C_2$ to $C_8$ amino-carboxylic acid is present in an amount ranging from about 2 wt % to about 20 wt % of a total wt % of the dispersion such that a weight ratio of the metal oxide nanoparticle to the $C_2$ to $C_8$ amino-carboxylic acid ranges from 1:1.25 to 4:1.

20. A jettable composition, consisting of:
   a. a metal oxide nanoparticle having the formula (1)
      $M_mM'O_n$
      i. wherein M is an alkali metal,
      ii. m is greater than 0 and less than 1,
      iii. M' is any metal,
      iv. and n is greater than 0 and less than or equal to 4;
   b. a zwitterionic stabilizer, wherein:
      the zwitterionic stabilizer is a $C_2$ to $C_8$ amino-carboxylic acid is selected from the group consisting of beta-alanine, gamma-aminobutyric acid, glycine, and combinations thereof, and the $C_2$ to $C_8$ amino-carboxylic acid is present in an amount ranging from about 2 wt % to about 20 wt % of a total wt % of the dispersion; or
      the zwitterionic stabilizer is taurine and is present in an amount ranging from about 2 wt % to about 35 wt % of a total wt % of the dispersion; and
   c. an additive selected from the group consisting of an anti-kogation agent, a chelating agent, an antimicrobial agent, and combinations thereof; wherein the additive is present in an amount ranging from about 0 wt % to about 20 wt % based on a total wt % of the jettable composition; and
   a balance of water.

* * * * *